Sept. 7, 1943.    E. R. ALLING    2,328,885
WEIGH TANK
Filed Nov. 16, 1939    7 Sheets-Sheet 1

INVENTOR
E. Roy Alling
By Parker, Rockwood & Ferrer
ATTORNEYS

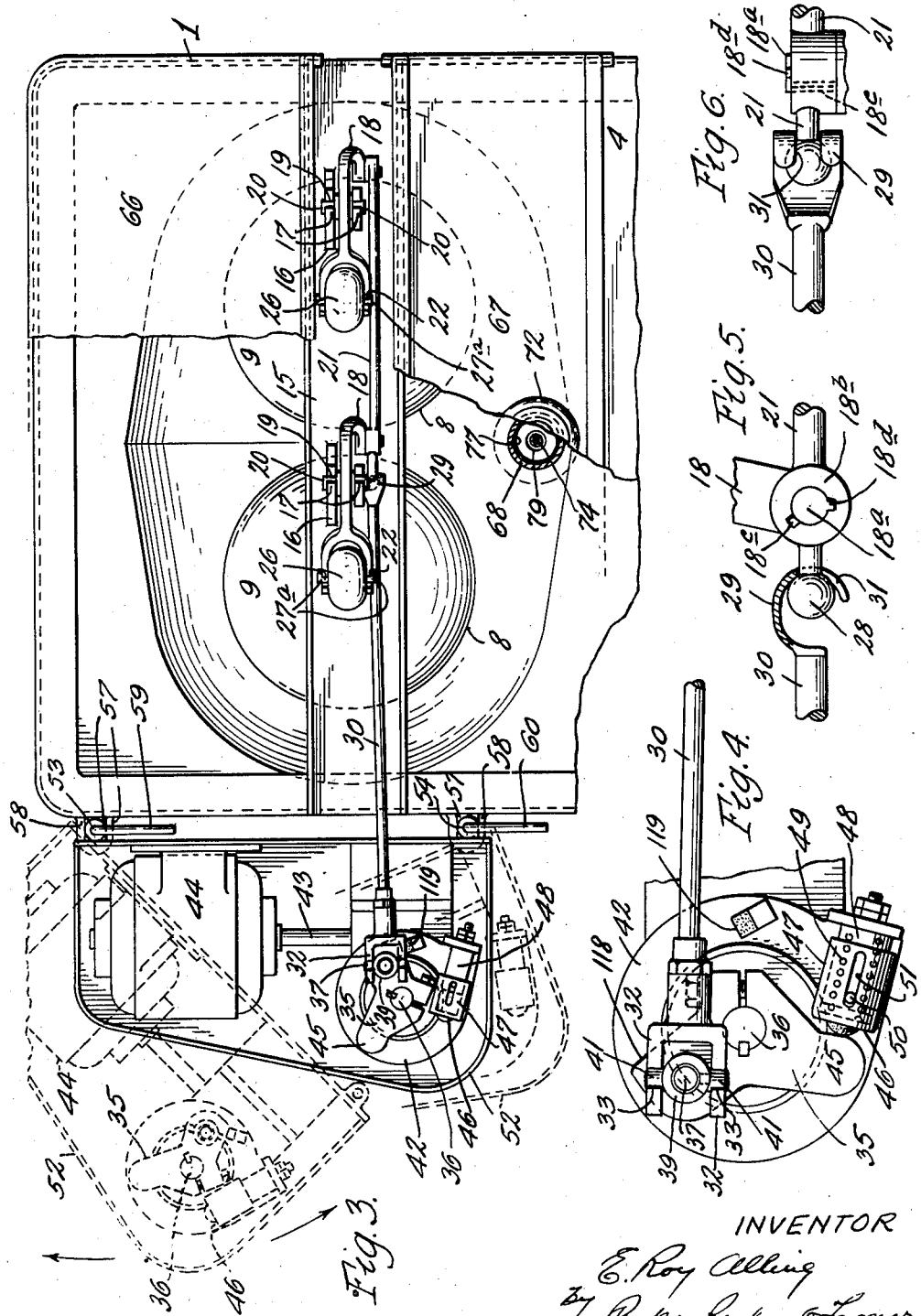

Sept. 7, 1943.  E. R. ALLING  2,328,885
WEIGH TANK
Filed Nov. 16, 1939  7 Sheets-Sheet 3
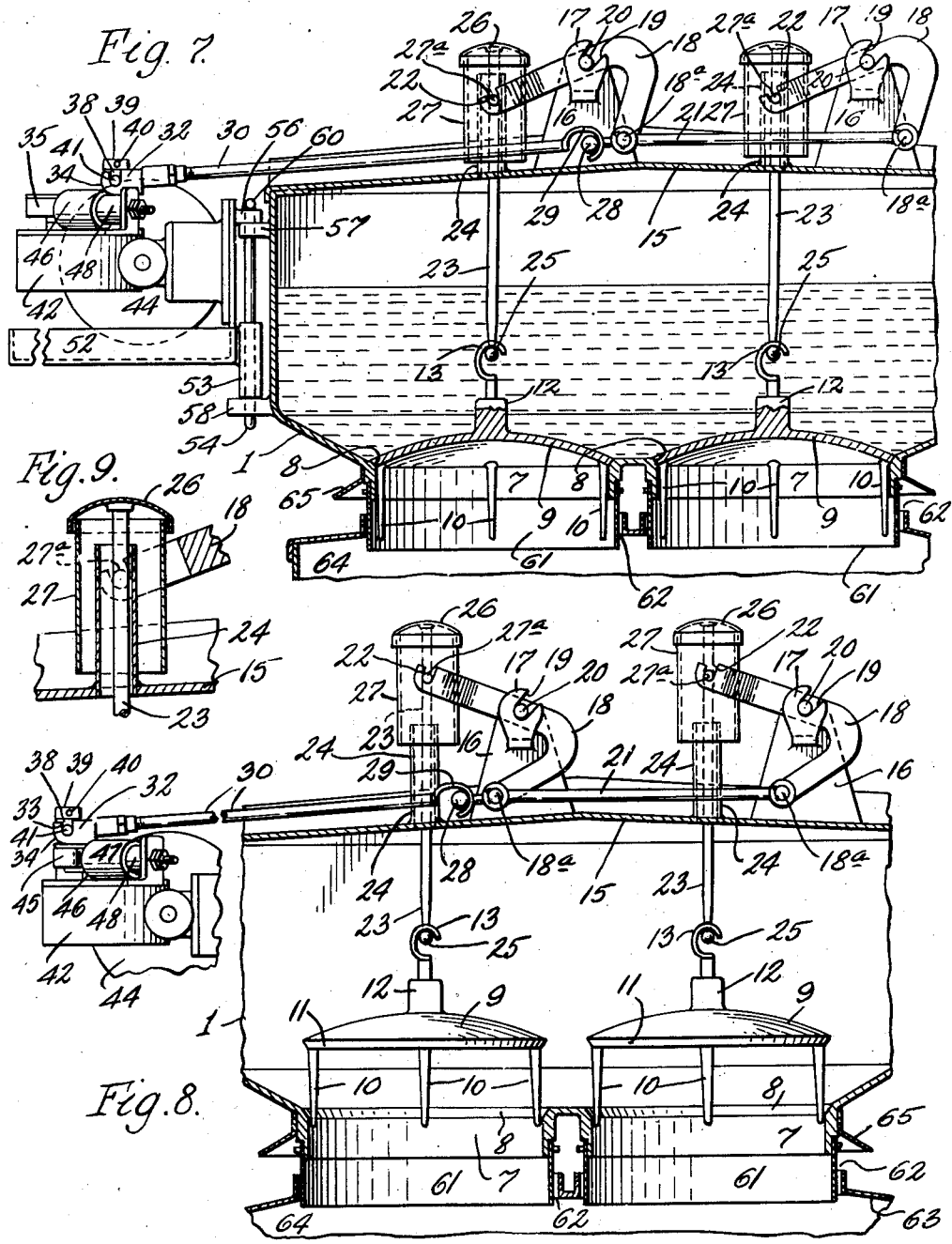
INVENTOR
E. Roy Alling
by Parker, Prochard & Farmer
ATTORNEYS Sept. 7, 1943.   E. R. ALLING   2,328,885
WEIGH TANK
Filed Nov. 16, 1939   7 Sheets—Sheet 4
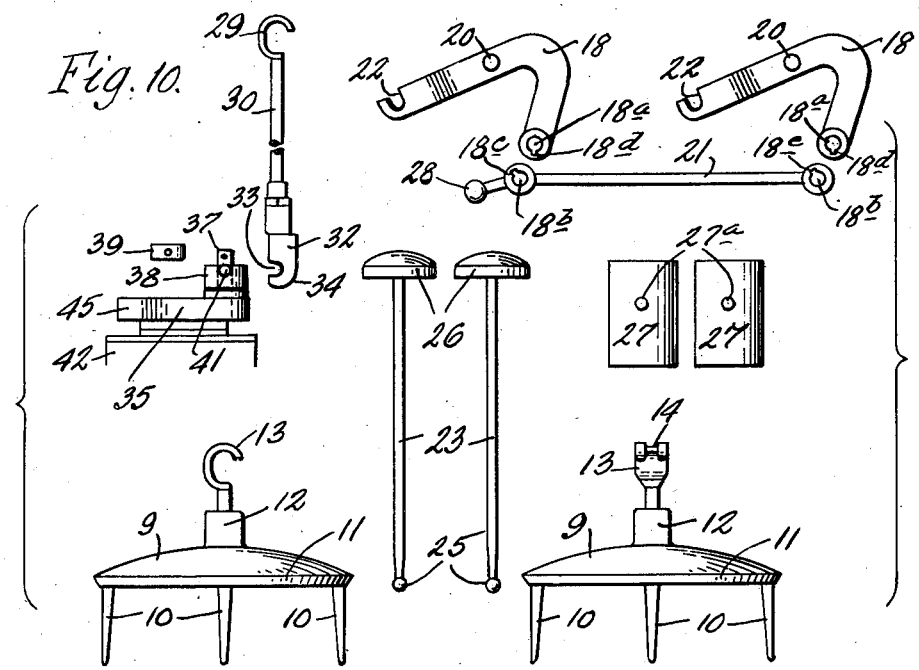
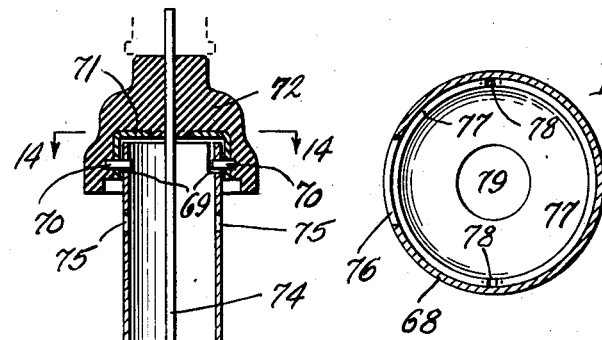
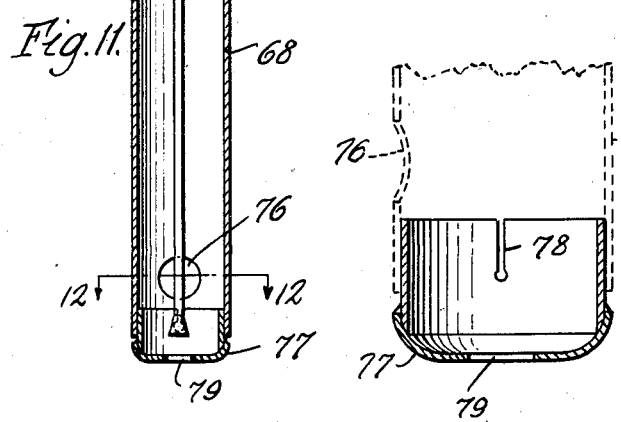
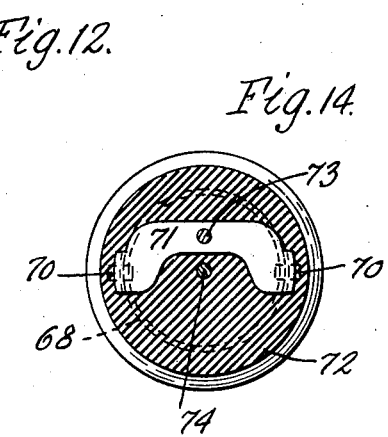
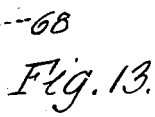
INVENTOR
E. Roy Alling
By Parker, Hickman & Farmer.
ATTORNEYS

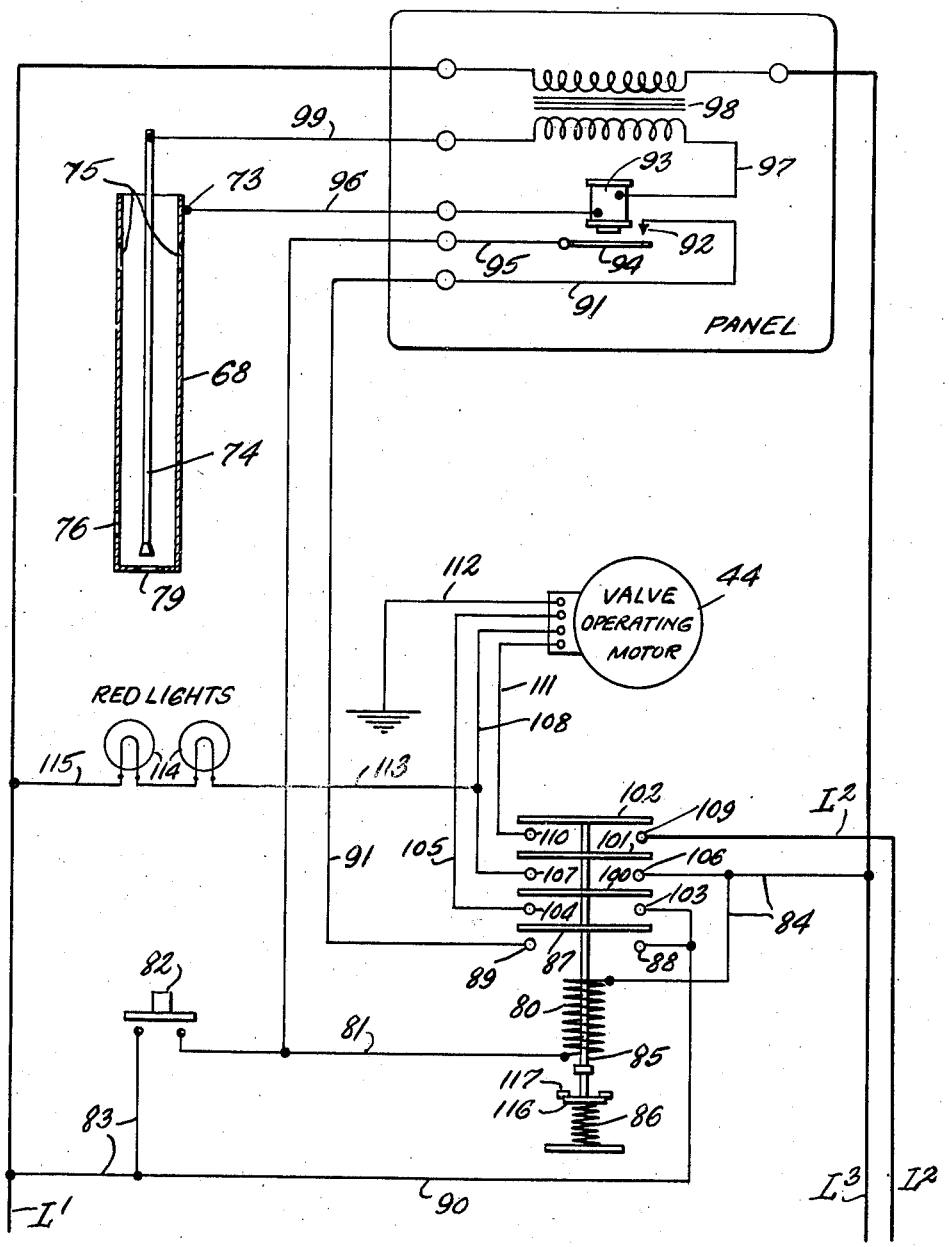

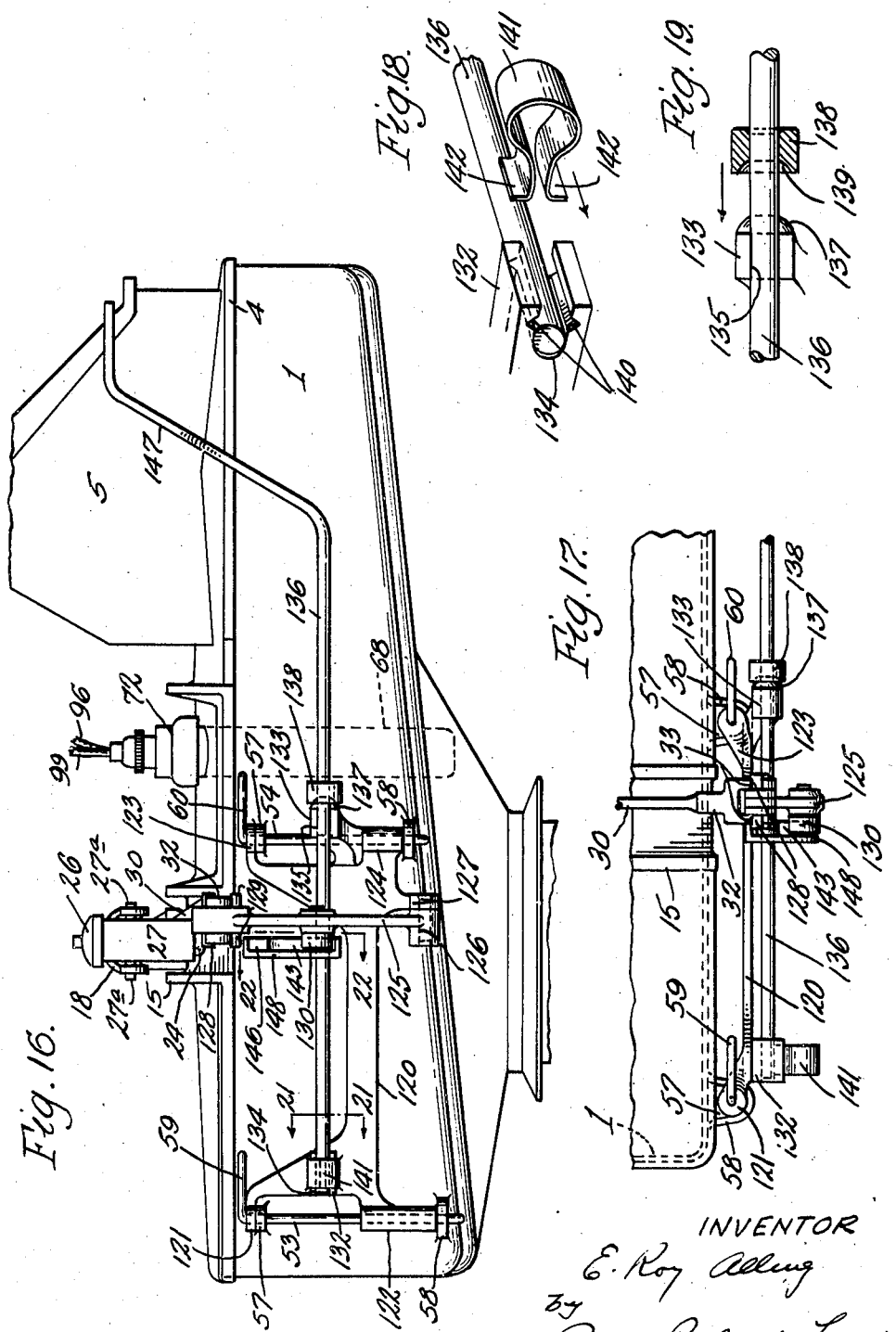

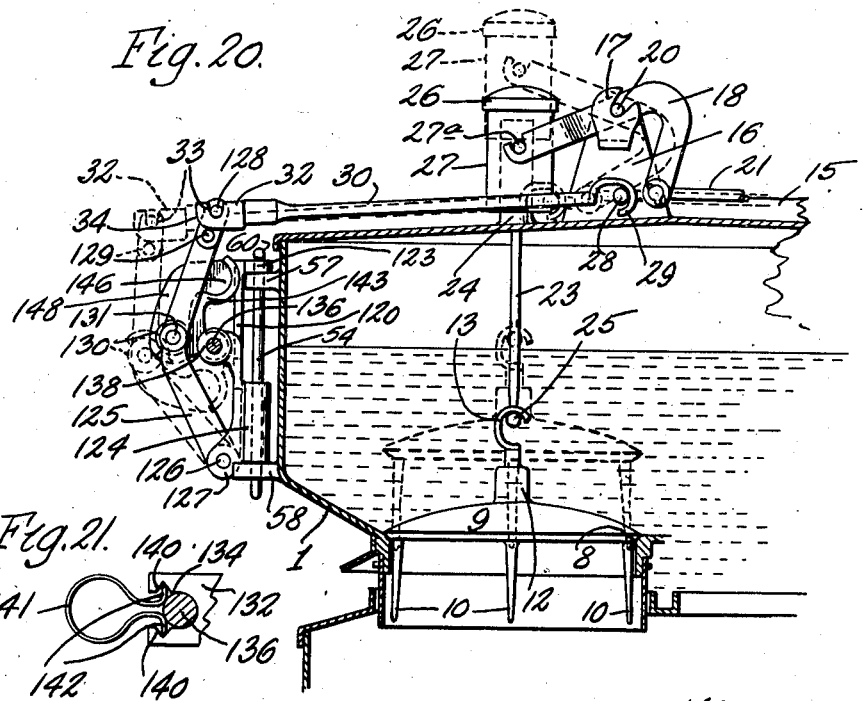
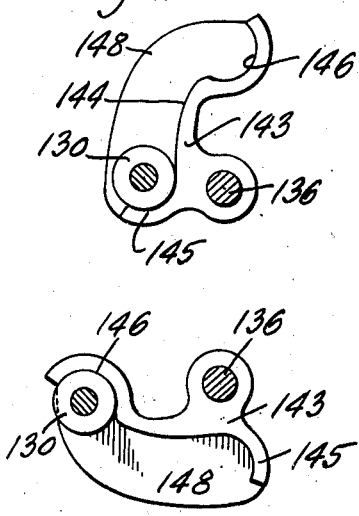
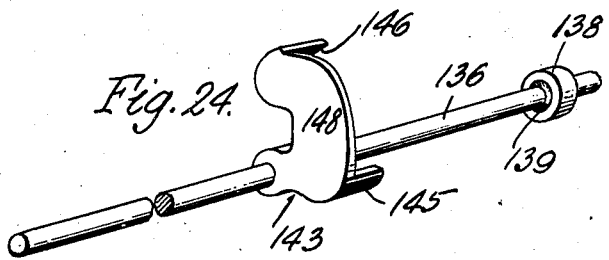
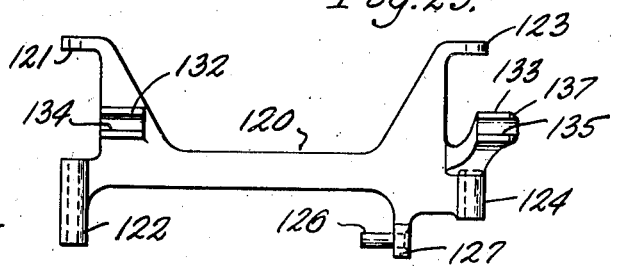

Patented Sept. 7, 1943

2,328,885

UNITED STATES PATENT OFFICE 2,328,885

WEIGH TANK

E. Roy Alling, Kenmore, N. Y.

Application November 16, 1939, Serial No. 304,872

27 Claims. (Cl. 137—68)

This invention relates to weigh tanks and particularly to the means for discharging the contents thereof after the same have been weighed and sampled.

One object of the invention is to improve, expedite and simplify the discharge of contents of weigh tanks after the contents have been weighed and sampled.

Another object of the invention is to provide improved means for discharging the contents of a weigh tank after a weighing and sampling operation, with which maximum speed of emptying of the tank may be accomplished in a simple manner; with which leakage will be reduced to a minimum; with which the opening of the runout valves may be quickly initiated and the valves quickly closed; with which the emptying of the tank and closing of the run-out valve will be automatic after the operator initiates the operation; with which danger of emptying additional liquid into the tank before the run-out valve is closed will be prevented; with which danger of the closing of the valve before all the contents have run out will all be prevented; with which the opening and closing movements of the valve will be relatively rapid; with which all the valves and valve operating parts may be quickly disassembled for cleansing; with which all parts of the tank may be easily accessible for cleaning; with which straight line or forward empting of milk cans and the like into the weigh tank is possible; with which there will be a minimum number of parts to be cleaned; with which the attendant may cause the tank to be emptied by merely performing a simple initiating operation without leaving dumping position, or shifting any mechanism, by merely operating a simple button; and which will be relatively simple, compact, practical, dependable and inexpensive.

Another object of the invention is to provide improved, manually operable mechanism detachably mountable on the tank for operating the valves, all of the parts of which may be disassembled easily and quickly for cleansing.

Another object of the invention is to provide improved manually operable mechanism for opening and closing the valves which may be interchangeably substituted for the power operated mechanism for opening and closing the valves, with which the manually operated mechanism may be substituted as a unit for corresponding power mechanism, with which the manually operated mechanism is attached to the tank in the same manner as power operated mechanism and to the same connections, and which may be applied to the tank or removed in a simple and rapid manner.

Other objects and advantages will be apparent from the following description of two embodiments of the invention, and the novel features will be particularly pointed out in connection with the appended claims.

In the accompanying drawings:

Fig. 3 is a plan of the same, and illustrating by dash lines the manner in which the power operating means for the runout valves may be swung away from the tank to expose the entire tank surface for cleansing;

Fig. 4 is a plan of part of the valve operating mechanism of Fig. 3, but in a position occupied when the valve is fully open and on a larger scale;

Fig. 5 is an elevation, partly in section, of part of the valve operating mechanism;

Fig. 6 is a bottom view of the parts shown in Fig. 5;

Fig. 7 is a sectional elevation through the tank to illustrate the valve construction and arrangement, and the operating mechanism therefor, the run-out valves being in closed position;

Fig. 8 is a similar sectional elevation, but with the valves in open position;

Fig. 9 is a sectional elevation through the support for the valve operating mechanism, and illustrating the usefulness of certain details;

Fig. 10 is an elevation of a group of the valves and valve operating parts disconnected from one another but in position for reassembly;

Fig. 11 is a sectional elevation through the tube and part of the mechanism for controlling the automatic closing of the valve;

Fig. 12 is a sectional plan of the same, the section being taken approximately along the line 12—12 of Fig. 11;

Fig. 13 is a longitudinal sectional elevation of the lower end of the tube similar to Fig. 11 but on a larger scale;

Fig. 14 is a sectional plan through the cap of the tube, to show the manner of establishing electrical connections to the tube and the electrode, the section being taken approximately along the line 14—14 of Fig. 11;

Fig. 15 is a schematic and wiring diagram illustrating the electrical system and connections;

Fig. 16 is a side elevation of the tank having applied thereto a manually operated valve opening mechanism which may be attached to the tank and to the valve opening mechanism interchangeably with the power operated mechanism.

Fig. 17 is a plan of a portion of the tank to which the valve operated mechanism has been applied as in Fig. 16;

Fig. 18 is a perspective illustrating the manner of mounting one end of the operating shaft of the same;

Fig. 19 is an elevation, partly in section, of the manner of mounting another portion of the shaft for rotation;

Fig. 20 is a transverse sectional elevation through a portion of the tank, and illustrating the manually operable mechanism on the side of the tank for operating the valves;

Fig. 21 is a transverse, sectional elevation through the hand operated shaft to show the bearing construction for one end of the shaft, the section being taken approximately along the line 21—21 of Fig. 16;

Fig. 22 is a sectional elevation through the hand shaft, the section being taken approximately along the line 22—22 of Fig. 16 to show the construction of the cam;

Fig. 23 is a view similar to Fig. 22 but with the cam in a different operated position in which it opens the valve;

Fig. 24 is a perspective of the operating shaft with cam attached; and

Fig. 25 is an elevation of the frame for mounting the manually operated mechanism, which is interchangeable with the frame of the power mechanism for opening and closing the valve.

Figure 1:
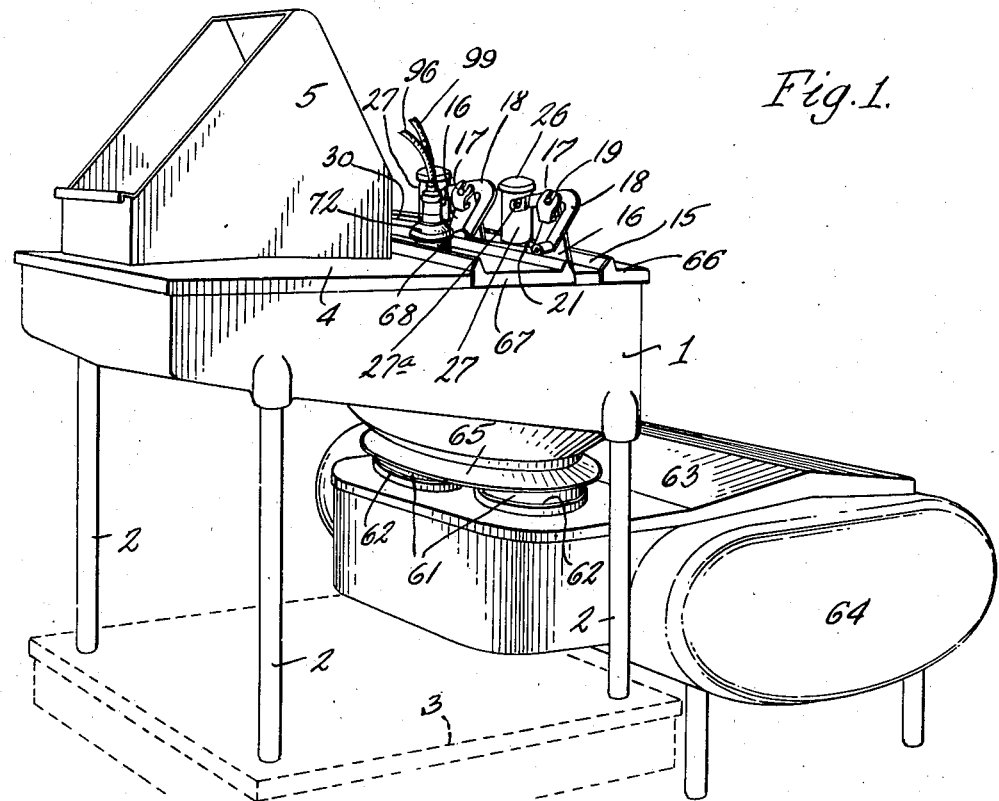
Fig. 1 is a perspective of a weigh tank constructed in accordance with this invention and disposed in weighing position and for discharge of its contents into a mixing tank.

In the embodiment of the invention illustrated in Figs. 1 to 15 the improved weigh tank 1 (Fig. 1) is mounted in a suitable manner such as by legs 2 upon a weighing platform 3. The tank 1 is provided with a cover 4 having adjacent one end thereof a hood 5 which may contain straining means and through which liquids such as milk may be emptied into the weigh tank from a plurality of containers for weighing and sampling. The bottom wall of the tank 1 slopes toward a plurality of run-out valves (Figs. 7 and 8) arranged side by side. These run-out valves are provided by run-out passages or openings 7, each having a bevelled valve seat 8.

In each opening 7 is disposed a run-out valve element 9 which has depending legs or arms 10 that pass through or along the tube or passage 7 and guide the valve element for free vertical movement, and that have sufficient clearance with the walls of the passage 7 to enable the valve element 9 to seat itself firmly on the bevelled seat 8, it being understood that each valve element 9 has a bevelled valve periphery 11 which, when that valve element is closed, rests upon a bevelled seat 8. These valve elements 9 may be upwardly convex as shown in Figs. 7 and 8, and each has an upstanding boss 12 terminating in a hooked end 13, which hooked end has a slot 14 opening from the free end of the hook, as shown in Fig. 10.

A support 15 (Figs. 7 and 8) extends across the open upper end of the tank and carries on its upper face a pair of upstanding pivotal supports 16. Each of these supports has a pair of arms 17 (Figs. 2 and 3) between which a bell crank lever 18 is removably disposed. These arms 17 of each support both have aligned slots 19 opening upwardly therein, and each bell crank 18 has pins 20 which are received in said slots 19 so as to form a pivotal or rocking support for the bell crank lever. The depending arms of the bell crank levers 18 are pivotally connected by a link 21, it being understood that the two bell cranks are disposed in tandem arrangement the same as the run-out valves 9. To enable disconnection of link 21 from levers 18, each lever 18 has a stud 18a extending from a face thereof through a related eye 18b on link 21. Each eye 18b has a groove or slot 18c in its bearing wall lengthwise from face to face, and each stud 18a has a radial tongue 18d on its end beyond the eye, so that by turning each lever 18 in the eye 18b until the tongue 18d is in alignment with slot 18c, the eye and stud can be separated or assembled. The slot 18c or tongue 18d are so disposed angularly with respect to one another that they are out of alignment when in normal connected positions during use. The other end of each bell crank lever is forked and provided with notches 22 that extend downwardly into each arm of the fork in the upper edge thereof. A link or rod 23 (Figs. 7 and 8) extends upwardly from the tank through a tubular sleeve or boss 24 (Figs. 8 and 9) with substantial clearance and terminates at its lower end in a spherical head or ball 25 which engages beneath the hooked end 13 on the valve element 9 immediately below the shank of the rod 23 passing through the slot 14 (Fig. 10).

The upper end of each link 23 is provided with a T-shaped head or cap 26, which rides upon the top of and closes a tube 27 that fits loosely over the tube 24 so as to rise and fall over, as well as move laterally of, the tube 24. The tube 27 has diametrically disposed pins 27a which are received in notches 22 of bell crank 18. The opening or passage of each sleeve 24 in the support 15 through which the shank of a rod 23 extends, is large enough to pass the head 25 to enable removal of each rod 23 from the support when disconnected from the valve element 9, and to allow some lateral movement of each rod 23. The cap 26 and tubes 24 and 27 provide for vertical movement of rod 23, with sufficient lateral clearance, but prevent the entrance of foreign matter into the tank through tube 24.

The link 21 (Figs. 5 and 6) which connects the depending arms of the bell cranks extends beyond one of the bell cranks and terminates in a head 28 which hooks into a hooked end 29 provided on one end of a link 30 extending to one side of the tank (Fig. 3). The hooked end 29 is provided with a slot 31 from the free end of the hook, in approximately central line position of the link 30, as shown in Figs. 5 and 6, so that the shank of the rod 21 may pass through the slot in coupling and uncoupling the rod 21 and the link 30. The other end of the link 30 is forked to provide arms 32 (Figs. 3 and 4) and each forked arm 32 has a notch 33 extending therein from an edge of the arm. The other edge of each arm 32 is curved as at 34. A rotary head or crank member 35 (Figs. 3 and 4) is fixed on a vertical shaft 36 for rotation therewith and this member 35 carries an upstanding pin 37. A sleeve 38 (Figs. 7 and 8) is rotatably confined on the pin 37 in any suitable manner such as by a removable collar 39 which is pinned on the upper end of the pin 37 by a suitable set screw or cotter pin 40 (Figs. 7 and 8).

The sleeve 38 carries a pair of aligned pins 41 extending from diametrically opposite sides thereof, which may be received in the notches 33 (Fig. 10) of the fork arms 32 of link 30. Thus the sleeve 38 with its pins 41 may swivel on pin 37 of the crank member 35, as the latter rotates, and acts to reciprocate the link 30 connected to the valve lifting mechanism. It will be noted that the curved edge 34 (Fig. 10), of the fork arms 32 enables the slots 33 to be passed over the pins 41 while in the position shown in Fig. 10, then as the link 30 is swung downwardly into a horizontal position, curved end 34 will provide sufficient clearance for the swinging movement. When the link 30 is in the approximately horizontal position as shown in Figs. 7 and 8, the curved lower edge 34 will engage upon the upper face of the crank member 35 so that it cannot drop out of engagement with the pins 41, yet the link 30 is free to swivel on the pin 37.

The shaft 36 is connected through a speed reduction gear box 42 to the driving shaft 43 of an electric motor 44. The motor 44 is of the ordinary, rotary type of electric motor, preferably one which will stand a substantial overload for long periods of time without overheating, even though the motor may be stalled. Such motors are available in the open market and the details thereof do not, per se, form a part of this invention. When current is supplied to the motor 44 it rotates its shaft 43 and the latter through the gear box 42 slowly revolves the crank member 35, and through its connection to the link 30 operates the link 30 endwise to rotate or rock the bell cranks 18 from the positions shown in Fig. 7 to the positions shown in Fig. 8. During this movement the valve elements 9 will be lifted and any liquid in the tank will be allowed to run out from the valve openings 7. The motor 44 will continue to rotate until an arm 45 on the crank member 35 engages against a highly resilient, spring stop 46 mounted on the frame of the gear box 42, and then further rotation will compress this stop 46 from the position shown in Fig. 3 to that shown in Fig. 4. Thereupon further movement of the motor and the crank member 35 will be prevented, although current is still being delivered to the motor. The motor is then in the condition known as a stalled condition in which it is exerting a rotary torque tending to maintain the valve elements 9 in open position as shown in Fig. 8.

This resilient or spring stop 46 may be of any suitable construction, but it preferably comprises a cup-shaped cap or sleeve 47 (Fig. 4) which reciprocates over a tubular stem 48, and a helical compression spring 49 is disposed in the stem 48 in a position to engage against the inner closed end of the cap 47 and urge it outwardly on the stem 48. A pin 50 on the stem 48 has relative reciprocation in a slot 51 in the cap 47, so as to limit the outward movement of the cap 47 under the action of spring 49 when the cap is released by the arm 45. When the current to the motor 44 is discontinued, the spring 49 immediately urges the cap 47 outwardly and through it starts the crank member 35 in a reverse direction, which immediately begins the closing of the valves. This spring stop, when the current of the motor is discontinued, quickly, promptly and definitely starts the reversal of the motor and return of the motor and valves to an initial position in which the valve elements 9 are closed on their seats as shown in Fig. 7. The weight of the valves 9 and rods 23 are sufficient to return the valves to closed position and also operate the motor back to initial position after the motion is once started by the spring stop 46.

The motor 44 and gear box 42 are mounted on a frame 52 (Figs. 2, 3 and 7) which is hinged at both ends by vertically extending rods 53 and 54 to one side of the tank 1. The rod 53 passes through suitable bearings 55 and 56 on the frame 52 (Fig. 7), and through bearing bosses 57 and 58 provided on the side of the tank.

The upper end of the rod 53 is bent laterally as at 59 so as to form a handle by which the pin may be removed by pulling it upwardly, or reinserted to couple the frame 52 to the tank. The pin 54 similarly connects the frame 52 at its other end to the side of the tank 1, and pin 54 also has at its upper end a lateral extension 60 by which the pin 54 may be removed or reinserted by moving it vertically to couple or uncouple the tank 1 and the frame 52. Thus by pulling the pin 54 outwardly, one end of the frame 52 may be released so as to swing about the pin 53 as a pivot. Similarly by removing the pin 53 the frame 52 is released for swinging movement about the pin 54 as a pivot or hinge. In that way the frame 52 with the motor 44 and gear box 42 may be swung away from the tank at either end of the frame 52 selectively so as to make possible complete exposure of the entire face of the tank which would otherwise be covered by frame 52, motor 44 and gear box 42.

The outlet passages 7 which are controlled by the valves 9 have depending tubular walls 61 (Figs. 7 and 8) which depend loosely into openings 62 provided in the cover 63 of the mixing tank 64, and a frusto-conical flange or skirt 65 (Fig. 1 also) may be provided on the tank 1 to surround the openings 62 in the cover 63 of the mixing tank 64 and prevent the entrance of foreign matter into the mixing tank, yet allow of limited free vertical movement of the weigh tank with the depending sleeves or walls 61 which necessarily must have free clearance in the openings 62 in order to permit weighing of the weigh tank with and without contents.

The cover 4 may have separable sections 66 and 67 (Fig. 2) on opposite sides of the support 15 and upon one of these cover sections, such as 67, I mount a control tube 68 in a manner to depend into the interior of the tank 1 into close proximity to the bottom of the tank, and preferably in relatively close proximity to one of the valves 9. This control tube 68 is preferably a metal tube which is connected by bayonet slots 69 (Fig. 11) at its upper end to pins 70 carried by a metal strip 71 on the inside of a molded cap member or support 72 which rests upon the upper face of the cover section 67. The intermediate part of the metal strip 71 is offset laterally from the center and is provided with an upstanding rod 73 (Fig. 14) which extends through the cap 72 for connection to circuit wires, as will be explained presently.

Also carried by the cap 72 centrally thereof is a metal rod 74 which depends through the cap 72 and down tube 68 to a point adjacent the bottom thereof, this portion of rod 74 within the tube functioning as an electrode in a manner to be explained presently. The outer end of the rod 74 is connected in a circuit in a manner to be explained presently. The tube 68 is provided near its top with one or more openings 75 to allow the escape and entrance of air and the rise or fall of liquid in the tube 68. The tube 68 is also provided adjacent, but slightly above, its bottom with one or more other openings 76 of relatively large size so that as the liquid level in the tank rises, this liquid may enter the tube 68 freely through the opening 76 and rise in the tube so as to maintain a liquid level within the tube equal to that outside the tube. The tube 68 is closed at its bottom by a removable, frictionally held cap 77 (Fig. 13) which, by reason of slots 78, enables it to be frictionally telescoped with the lower end of the tube 68. The bottom of the cap 77 is provided with a restricted opening 79, the size of this opening to be calibrated in accordance with a desired time interval in a manner to be explained presently.

Referring now particularly to the schematic diagram shown in Fig. 15, the tube 68 and electrode 74 are shown schematically. Current for the motor and other operating mechanism is supplied by three line wires L¹, L² and L³ as usual in commercial three wire installations. One end of a solenoid 80 is connected by a wire 81 to one side of a normally open switch 82, the other side of the switch being connected by a wire 83 to line wire L¹. The other side of the solenoid 80 is connected by a wire 84 to the line wire L³. Thus when the switch 82 is closed, it completes a circuit from line wire L¹ through wire 83, switch 82, wire 81, solenoid 80 and wire 84 to line wire L³. This energizes the solenoid 80 and causes it to attract its armature 85 against the action of spring 86 and until its contact bridge 87 carried by the core of the solenoid engages and connects contacts 88 and 89. The wire 83 is connected by an auxiliary wire 90 to the contact 88, and thus when the bridge 87 engages contacts 88 and 89, it completes a holding circuit from wire L¹, wire 83, wire 90, contact 88, bridge 87, contact 89, wire 91, contact 92 of relay 93, armature 94 of relay 93, and wire 95 to wire 81, thence through solenoid 80 and wire 84 to line wire L³.

The winding of relay 93 is connected at one side by wire 96 to the rod 73 which is connected to the control tube 68, and the other side of the relay winding 93 is connected by a wire 97 to one side of the low voltage winding of a step-down transformer 98, the other side of that winding being connected by wire 99 to the electrode 74. The primary winding of the transformer 98 is connected at one side to the line wire L³ and at its other side to the line wire L¹, and because of the voltage step-down action of the transformer 98, it imposes a continuous low voltage upon a circuit including the secondary winding thereof and the relay 93. When a liquid is in the tube 68 in contact with both the metal of the tube 68 and the electrode 74, it completes the low voltage circuit and a low voltage current passes through the secondary winding of the transformer of the winding of the relay 93 to attract the armature 94 and close the holding circuit between wire 95 and contact 92. The core 85 of the solenoid 80 also carries a series of other bridges 100, 101 and 102.

The bridge 100, when the solenoid 80 is energized, engages and connects a contact 103 which is also connected with the contact 88 and a contact 104 which is connected by wire 105 to the valve operating motor 44. The bridge 101, when the solenoid 80 is energized, connects contacts 106 and 107. The contact 106 is connected to the wire 84, and the contact 107 is connected by a wire 108 also to the valve operating motor 44. The bridge 102 is adapted, when the solenoid 80 is energized, to engage with and electrically connect a contact 109 which is connected to the line wire L² and a contact 110 which is connected by a wire 111 to the valve operating motor 44. The frame on the valve operating motor 44 is also grounded by a wire 112 so as to avoid any possibility of shock to the operator who might come in contact with the motor. One of the wires to the motor, such as the wire 108 is also connected by a wire 113 to one or more suitable signal devices 114, and thence by wire 115 to line wire L¹.

These signal devices are conveniently lights, such as red lights, and when the solenoid 80 is energized, the lights or signal devices will be rendered effective by a circuit from line wire L¹, wire 115, lights 114, wire 113, wire 108, contact 107, bridge 101, contact 106, and wire 84 to line wire L³. When the solenoid is deenergized, the circuit through the lights 114 will be broken. Thus the lights when illuminated will indicate that the solenoid 80 is energized and that the motor is either opening or is in open position, which is a signal to the attendant not to dump milk or other liquid into the weigh tank during the time when the lights are burning, because the run-out valves are then either being opened or are open. When the solenoid is deenergized, the spring 86 returns the bridges 87, 100, 101, 102 to open circuit positions shown in Fig. 15, the movement being limited in any suitable manner such as by the engagement of an arm 116 on the core of the solenoid with one or more stops 117.

Figure 2:
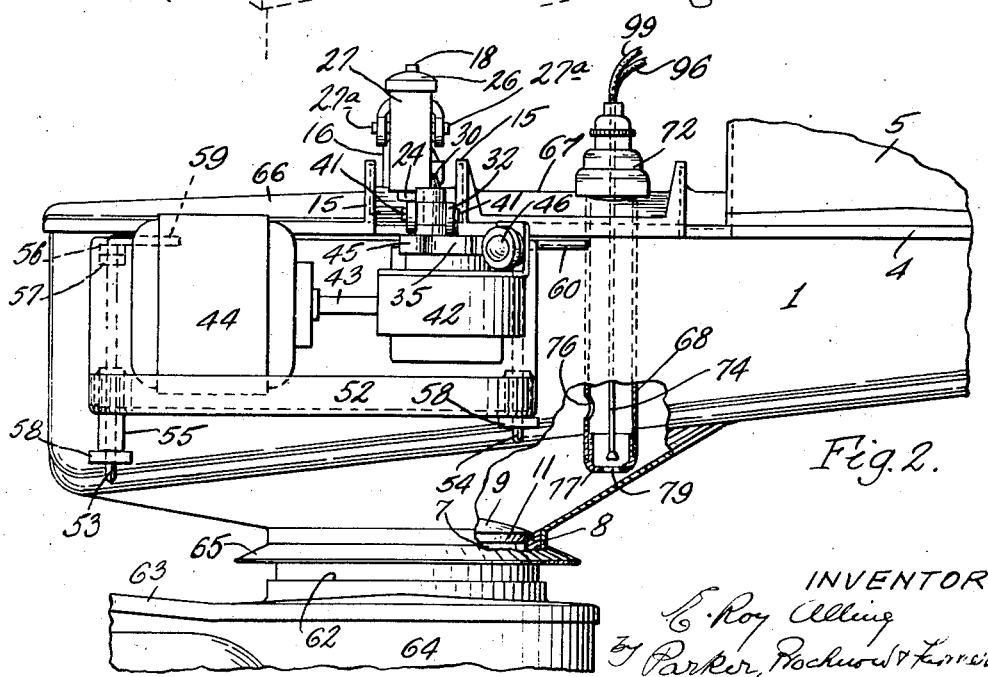
Fig. 2 is one side elevation of the same, with a portion broken away to show interior parts thereof.

Assuming that the tube 68 is in the position shown in Fig. 2 in which it depends into the tank toward the bottom thereof, and assuming that the valves 9 are closed, the procedure will be as follows: The attendant, as he receives milk from any given source, will empty the cans successively through the straining hood 5 on the tank 4, then pass the cans to the usual washer. The milk or other liquid from any given customer or source is all dumped into the weigh tank 1 where it is mixed to some extent, and after weighing the same the attendant takes a sample from the tank, after which the milk is ready to be discharged into the mixing tank 64 which may contain milk from other producers or sources. To empty the weigh tank, the attendant merely closes momentarily the normally open switch 82, which causes an energization of the solenoid 80, and the latter then, by operation of the bridges 100, 101 and 102, completes a circuit to the valve opening motor 44 to open the valves and hold them open, and as soon as the solenoid reaches its fully retracted position it completes the holding circuit through the relay armature 94.

It will be understood that when the milk was placed in the weigh tank, it entered the control tube 68 through the openings 76 and 79 until the liquid level within the tube 68 was the same as outside of the tube in the tank. When the liquid level arose in tube 68, it completed a circuit between the metal of the tube 68 and the electrode 74 which energized the relay 93 and caused a closing of the armature 94 thereof to complete the holding or stick circuit of the solenoid 80. This holding circuit was ineffective to cause energization of the solenoid 80 because this holding circuit was at that time open at the contacts 88 and 89. The relay 93, however, remains energized. Then after the weighing and sampling of the contents of the tank, when the attendant operates the button 82, the solenoid 80 is energized and then the holding or stick circuit of the solenoid 80 is at once completed through the contacts 88 and 89, which holds the solenoid 80 energized even though the switch 82 is again immediately opened. The motor 44 is then started and operated, and through the gear box 42 it rotates the crank member 35 and through the link 30 it operates the valve lifting mechanism to lift both valves from the closed position shown in Fig. 7 to the open position shown in Fig. 8.

Just before the fully open valve position in Fig.

8 is reached, the arm 45 on the crank member 35 engages and compresses the spring stop 46 which stalls the motor 44 as the fully open position is reached, but since the motor is preferably one which will stand an overload in stalling for a substantial or lengthy period of time without injury, the motor merely exerts a continuous torque which holds the valve open so long as the solenoid 80 remains energized. When the valves 9 are opened, the liquid in the tank 1 of course begins to run out rapidly, and the liquid in the control tube 68 will also descend in level to follow the level of the liquid outside of the tube 68 but in the tank 1. Thus the liquid level in tube 68 will follow that in the tank 1 until the opening 76 is reached, and then as the level in the tank 1 sinks below that of the opening 76 of tube 68, the liquid can only escape from the control tube 68 through the restricted opening 79 in the bottom thereof.

This opening 79 is of such size that the time required for the liquid to escape therefrom and bring the liquid level in tube 68 below the level of the lower end of electrode 74, is approximately the time required for the liquid level in the tank 1 to descend from the opening 76 of tube 68 to the valve outlet or seat 8. Since the liquid head or pressure causing the liquid to run out through the opening 79 varies through a definite range from the opening 76, the time interval for this liquid trapped in the bottom of tube 68 to drop below the lower end of the electrode 74 can be very nicely regulated by selecting the size of opening 79. When the liquid level in the tube 68 has dropped below the lower end of the electrode 74, or below the lower end of the metal of tube 68 or of bottom cap 77, the low voltage circuit through the relay 93 is then automatically opened, whereupon the armature 94 automatically opens, breaking the holding circuit through the solenoid 80 and causing a deenergization of the latter. The solenoid 80, being deenergized, interrupts the supply of current to the motor 44, whereupon the spring stop 46 which has been compressed by the torque of the motor, starts the crank member 35 and through it the motor 44 in the reverse direction, and the weight of the valve 9 and rods and links continues the movement and causes a rapid closing of the valves 9.

As soon as the solenoid 80 is deenergized, the signal lights 114 cease to burn and indicate to the attendant that the valves are closing, whereupon it is again safe to start dumping the supply of milk from another customer or source into the weigh tank for weighing and sampling. By this arrangement the attendant knows by the lighted or unlighted condition of the signal lamps 114, whether or not the run-out valves are closed, and therefore he will not be likely to start dumping milk from a new source into the tank before the valves are closed or while they are open. After the valves 9 seat, the motor and linkage will continue to move until an abutment 118 (Fig. 4) engages against another stop 119 which will provide sufficient slack in the valve operating linkage to allow the valves 9 to seat fully.

Heretofore it has been customary to employ a two compartment weigh tank, because it was impossible to obtain sufficiently rapid run-out capacity for one compartment. To obtain the desired run-out capacity for a single compartment weigh tank of the average milk receiving plant, it would be necessary to use a single valve 9 of about 18 or 19 inches diameter, but a valve so large is very likely to warp and not seat properly, in which case there would be leakage that would cause a loss to the farmers supplying milk to the plant. I have found that I can obtain the same run-out capacity by using two valves of approximately 12 inches diameter, connected for simultaneous operation, and that the 12 inch valves are not likely to warp or to become deformed in a manner to seat improperly and leak. With the single dump tank with sufficiently rapid run-out capacity, I am able to connect such a weigh tank in a straight line or forward supplying position with respect to the conveyor of full cans in a receiving system. It is easier to empty the cans received in this straight line position than where multiple compartment weigh tanks are employed, because the can is merely dumped forwardly in a normal position, the same for each can, and the axis of the can remains central with the long axis of the weigh tank.

While with this arrangement I employ two run-out valves, there will still be fewer parts to be cleaned than in the old two compartment type of weigh tank, because in the old type it was necessary to have two sets of strainers and covers. The attendant does not have to leave the dumping position to shift from one compartment to another or to open the run-out valve, and as soon as he completes the dumping of the contents of cans from any particular source into the weigh tank and weighs and samples the same, he merely pushes the button 82 and the opening and reclosing of the valves is then accomplished automatically. The attendant then merely prepares the cans from the next source for dumping and as soon as the signal lights go out, he can then begin dumping the cans from the next source. This automatic closing of the valves and indication of when they are closed, insures that the attendant will not close the valves too soon and before the emptying is complete because this would result in overpaying the producer supplying the next quantity of milk to the weigh tank. It also insures that the milk from a new source will not be dumped into the weigh tank before the valves are closed, because in that case, some of the milk would run on through and not be weighed, with resulting loss to the producer.

While I have illustrated the electrical rotary type of overload motor as the preferred form of power operating means for the valves, it will be understood that other power operating means may be employed within the broader concept of the invention. The electric rotary type of motor which will stand stalling and overload is preferable in many respects because, for example, it has a high starting torque to lift the valves at a time when the valves are held closed by considerable weight or head of milk or other liquid thereon. If a solenoid motor is used instead of the rotary motor, it has its minimum pull at the start because of the large air gap at that time, when the maximum opening force is necessary to overcome the weight of the liquid holding the valves closed. Solenoids would also be objectionable as noisy, because as soon as the valves are partially opened, the sudden decrease in operating load would cause a rapid operation of the solenoid with considerable impact and noise. With the electric motor of the type illustrated and described, I obtain smoother operation and high starting torque. Air and other power operating means could also be employed, but the electric motor enables a very simple and automatic control of the valves, and automatic closing and signalling.

In cases where an entirely manual operation of the valve mechanism is desired, or where a construction is desired that enables manual operation in case the power fails, a manually operable device is provided which may be attached to the tank interchangeably with the power operated mechanism. Such an arrangement is incorporated in the embodiment of the invention shown in Figs. 16 to 25.

Referring now to Figs. 16 to 25, the valve operating mechanism which is interchangeable with the power operated mechanism is mounted on the same lugs 57 and 58 provided on the tank 1 as is the power operated mechanism. A skeleton frame 120 (Fig. 25) is provided with bearing lugs 121, 122, 123 and 124 which receive the pins 53 and 54 (Fig. 16) that are used to connect the frame of the power operated mechanism to the tank 1. The pins 53 and 54 pass through corresponding aligned bearing lugs of the tank and of the frame 120, and thus serve to detachably connect the frame 120 to the tank. By removing either pin 53 or 54 the frame with the mechanism carried thereon can be swung upon the other of those pins away from the side of the tank 1 so as to expose the entire tank side for cleansing.

A lever 125 is pivoted by a stud 126 (Figs. 16, 20 and 25) to a boss 127 also provided on the frame 120. The lever 125 at its upper end is provided with axially aligned pins 128 extending from opposite faces thereof, which are detachably interengaged with the coupling head 32 of link 30 connected with the valve operating mechanism disposed over the tank, in the same manner that the link 30 is connected to the power operated mechanism in Figs. 1 to 14. Thus as the lever 125 is rocked away from the tank, it will pull on the link 30 and, through the valve operating mechanism on top of the tank, cause an opening of the valves, this valve opening position being shown in dash lines in Fig. 20. The coupling head 32 of link 30 is prevented from dropping away from the pins 128 by means of supporting pins 129 on the lever 125.

When the link 30 is disengaged from the valve operating mechanism above the tank, and is swung upwardly above the pins 128 into an upright position, the curved edges 34 of the forked end of the head 32 will clear the pins 129 and then the link 30 may be entirely disengaged from the pins 128. When the parts are assembled as shown in Fig. 20 the pins 129 prevent the link head 32 from dropping, yet allowing rocking movement of the link 30 about the pins 128. The lever 125 carries, intermediate of its ends, a roller 130 which is rotatably mounted on a stud 131 extending from one side face of the lever 125.

On the frame 120 I provide a pair of spaced bearings 132 and 133 which have their passages 134 and 135 respectively axially aligned with one another, and both of which are open lengthwise along one side thereof. A shaft 136 is mounted in the bearing passages 134 and 135, being inserted in and removed from the same by lateral movement through the slots in the sides of the bearings. The shaft 136 is free to move endwise as well as rotate in the bearings 132 and 133. One end face of the bearing 133 is made outwardly convergent or convex as at 137 (Fig. 19), this converging part being coaxial with the bore 135. A collar 138 is fixed on the shaft 136, so that when this shaft is disposed in the bearings 132 and 133 as shown in Fig. 17, the shaft may be moved endwise to carry the collar 138 against the bearing 133. The end face of the collar 138 which faces or abuts the bearing 133 is provided with a concave recess 139, which fits and telescopes over the convex or convergent end wall 137. This slight telescoping of the collar 138 with the bearing 133 provides a rotatable bearing between the collar 138 and the bearing 133, which locks the shaft 136 against lateral movement out of the bore 135.

In the bearing 132, which is shown on a larger scale in Figs. 18 and 21, the side walls of the slot leading to the bore 134 are provided with grooves 140 which run endwise and parallel to the bore. A somewhat U-shaped spring clip 141 has oppositely extending flanges 142 at the ends of the arms of the U, and the flanges 142 are slidably received in the grooves 140 of the bearing 132. By pinching the clip 141 slightly, the flanges 142 are brought together sufficiently to enable them to be inserted into the grooves 140 endwise, and slid along the grooves into the position shown in Figs. 17 and 21. Then when the spring clip is released, the arms thereof will spring apart and frictionally lock the clip in the grooves 140 and prevent movement of the shaft 136 laterally of itself out of the bore 134 of that bearing. Fixed on the shaft 136 at a point between the bearings 132 and 133 is a cam 143 (Figs. 16, 22, 23 and 24) and this cam has a cam surface 144 which extends from a limit flange 145 at one end thereof, to a recess or notch 146 radially further out on the cam member 143. The cam roller 130 rides against this cam surface 144, and the end of surface 144 adjacent the flange 145 is considerably nearer the shaft 136 than the end of the cam surface 144 which terminates in the notch, groove or recess 146.

When the cam 143 is in its upright position as shown in Figs. 16, 20 and 22, the roller 130 will lie adjacent the flange 145, and the lever 125 will be nearest to the tank 1 at its free end, that is, the end connected to the link 30, so that the valves will be closed, as shown in full lines in Fig. 20. If the shaft 136 is rotated counter-clockwise in Figs. 20 and 22, the cam surface 144 will force the roller 130 away from the side of the tank and this will cam the lever 125 from the full line to the dash line position shown in Fig. 20, at which time the roller will engage in the notch 146 of the cam surface so as to yieldingly hold the lever 125 in that position. This movement of the lever 125 causes a pull on the link 30 and an opening of the valves 9 in the same manner that the pull on the link 30 by the power operated mechanism (Figs. 1 to 14) opened the valves.

The shaft 136 is extended toward one end of the tank, which is the dumping end, and there is offset laterally to form a crank handle 147 convenient for operation by the attendant who dumps the milk into tank 1, then samples and weighs the milk, and then opens the valves to discharge the milk. After the milk has all run out from the weigh tank, the operator merely grasps the crank handle 147 and moves it back toward the tank, which causes a clockwise rotation of the shaft 146 in Fig. 20 and releases the roller 20, whereupon the weight of the valves then pulls the lever 125 back into the full line position of Fig. 20.

It is important to keep the shaft 136 from endwise movement unintentionally after the parts are assembled, and for that reason the cam 143 may be provided with a flange 148 which is in a plane transverse to the length of the shaft 136, and this flange 148 when the parts are assembled in normal operating position, as shown in Figs. 16 and 17, abuts against the end face of roller 130. Thus, the engagement of this flange 148 with the roller prevents endwise movement of the shaft 136 in a direction and sufficiently to allow disengagement of the collar 138 from the bearing 133. When it is desired to disassemble the apparatus, it is merely necessary to first disconnect the link 30 from the pins 128 of lever 125, whereupon the lever 125 may be swung entirely away from the cam 143 to carry its roller 130 out of the path of movement of the flange 148 when the shaft 136 and the cam 143 are moved endwise sufficiently to disengage the collar 138 from the bearing 133. This permits removal of the shaft 136, and easy disassembly of the entire hand operated mechanism for cleaning and sterilizing of all of the parts.

To reassemble the device, the shaft 136 is reapplied to the bearings 132 and 133 by movement laterally of itself through the slots into those bearings, and then by endwise movement of the shaft 136 the collar 138 is carried into telescoping engagement with the bearing 133, which locks the shaft 136 from removal from the bearing 133. The other end of the shaft 136 is then locked against removal from bearing 132 by the clip 141. The lever 125 is then swung up into the upright position shown in Fig. 20 and there reconnected to the link 30.

It will be observed that the hand operated mechanism may be interchangeably mounted on the tank with the power operated mechanism, through the same lugs on the tank and the same attaching pins which mount the power operated mechanism on the tank, so that the power operating mechanism for the valves may be easily and quickly removed, and the tank and the hand operated mechanism substituted therefor, if the electric power should fail and hand operation of the valves should become necessary or desirable. Where a plant desires hand operation of the valves, the hand operated mechanism that is illustrated in Figs. 16 to 25 may be supplied, and then if at a later date power operation of the valves is desired, it is merely necessary to remove the hand operated mechanism and substitute therefor the power operating mechanism. The substitution can be easily made even by relatively unskilled labor.

It will be understood that various changes in the details and arrangement of parts, which have been herein described and illustrated in order to explain the nature of the invention, may be made by those skilled in the art within the principle and scope of the invention, as expressed in the appended claims.

I claim as my invention:

1. An improved weigh tank having a run-out valve, motor operated mechanism connected to the valve for opening it and holding it open, means for causing an opening movement of said valve by said mechanism, and means controlled by the liquid of the tank which is released by the opening of said valve for incapacitating the holding action of said mechanism and causing a closing of said valve after the liquid level in said tank has descended below a selected level.

2. An improved weigh tank having a run-out valve, motor operated mechanism for opening said valve, means for causing an opening movement of said valve by said mechanism, means controlled by the liquid in said tank for incapacitating said valve opening means and causing a closing of said valve after the liquid level in said tank has descended below a selected level, and signal means automatically indicating the closed and open positions of said valve.

3. An improved weigh tank having a run-out valve, an upright tube in said tank having an opening adjacent its top and an opening in its side wall, and also having a restricted opening in its bottom, an electrode disposed in said tube to extend below said opening in said side wall, power operated means for opening said valve, and means controlled by the liquid level in said tube for automatically keeping said power operated means active to hold said valve open until the liquid level in said tube has fallen below the lower end of said electrode.

4. An improved weigh tank having a run-out valve, power operated means for opening said valve, means rendered effective by said power operated means during an opening movement of said valve for holding the valve open, and means including an electric circuit controlled by the liquid in the weigh tank for automatically rendering said holding means ineffective and initiating a closing movement of said valve after the liquid level in the tube has fallen below a selected level.

5. An improved weigh tank having a run-out valve, an electric rotary motor connected to said valve for opening the same, means including a solenoid for starting and controlling said motor, means including a push button for energizing said solenoid, a holding circuit closed by said solenoid for holding it energized, a normally open switch included in said holding circuit, an electromagnet for controlling said last named switch, and means controlled by the liquid level in said tank for energizing said electromagnet and causing a closing of said normally open switch, when the liquid level in said tank is above a selected level.

6. An improved weigh tank having a run-out valve, an electric rotary motor connected to said valve for opening the same, means including a solenoid for starting and controlling said motor, means including a push button for energizing said solenoid, a holding circuit closed by said solenoid for holding it energized, a normally open switch included in said holding circuit, an electromagnet for controlling said last named switch, means controlled by the liquid level in said tank for energizing said electromagnet and causing a closing of said normally open switch, when the liquid level in said tank is above a selected level, and signal means also rendered effective by said solenoid when energized for indicating the activity of said motor to open or hold open said valve.

7. An improved weigh tank having a run-out valve, means for opening said valve, an upright tube in said tank, open adjacent its top and intermediate its ends and also having a restricted opening in its bottom, an electrode disposed in said tube to extend below said opening intermediate said ends, and means controlled by the liquid in said tube in contact with said electrode and rendered effective by said valve opening means for automatically keeping said valve open until the liquid level in said tube has fallen below a selected level.

8. An improved weigh tank having a run-out valve, an overload rotary motor, means connecting said motor to said valve for opening the valve when said motor is operated in one direction, a resilient stop for limiting the movement of said motor in a valve opening direction, whereby said motor may be held on closed circuit to open the valve and hold it open, and the resilient stop will start the motor in reverse direction immediately upon the opening of the circuit of said motor, manually controlled means for causing an operation of said motor and means automatically responsive to the level of liquid confined in said tank under the control of said valve for incapacitating the torque of said motor on said valve upon a selected change in the level of said liquid controlled by said valve.

9. An improved weigh tank having a run-out valve, an overload rotary motor, means connecting said motor to said valve for opening the valve when said motor is operated in one direction, a resilient stop for limiting the movement of said motor in a valve opening direction, whereby said motor may be held on closed circuit to open the valve and hold it open, and the resilient stop will start the motor in reverse direction immediately upon the opening of the circuit of said motor, means including a manually operated switch and a solenoid controlled thereby for energizing said motor to open said valve, holding means for maintaining the circuit to the motor closed after it is closed by said manually operated switch, and means controlled by the presence of liquid in said tank above a predetermined level therein for rendering said holding means effective when said liquid level is above a selected level, and ineffective after the liquid falls below said selected level.

10. An improved weigh tank having a run-out valve, an overload rotary motor, means connecting said motor to said valve for opening the valve when said motor is operated in one direction, a resilient stop for limiting the movement of said motor in a valve opening direction, whereby said motor may be held on closed circuit to open the valve and hold it open, and the resilient stop will start the motor in reverse direction immediately upon the opening of the circuit of said motor, an approximately upright tube in said tank having a restricted opening in its bottom and an opening in its side wall above said bottom, an electrode in said tube extending below said opening in said side wall of said tube, and means rendered effective by the presence of liquid in said tube between said openings and in contact with said electrode for rendering said holding means effective until the liquid level in said tube descends below a selected level therein.

11. An improved weigh tank having an opening in the bottom thereof, a valve element mounted in said opening for vertical movement therein into and out of closed position, a support extending above said tank and having a downward extending slot, a bell crank having a pivot pin received in said slot, said bell crank having a notch in the upper edge of one arm thereof, means detachably engaged in said slot and depending into said tank and detachably hooked to said valve element, power operated means disposed at one side of said tank, and link means detachably connected to said bell crank and to said power operated means, whereby operation of said power operated means will elevate and lower said valve element, and said valve element, bell crank detachable means and link means may be disconnected from one another and from said power operated means for easy removal and cleaning.

12. An improved weigh tank having a pair of run-out openings in the bottom thereof, with a bevelled valve seat encircling each opening, a separated valve element mounted in each opening for vertical movement therein and having a seat portion engageable with the seat of that opening to close that opening when the valve element is lowered, a support extending across said tank, said support having downwardly opening notches, bell cranks having pivots slidingly received in said notches, each bell crank having a notch in the upper edge of one arm thereof, a pair of rods each releasably engaged in a notch of a bell crank, depending into said tank and having detachably hooked engagement with a valve element immediately below it, link means connecting the other arms of said bell cranks, power operated means mounted at the side of the tank and having a crank pin, a link detachably connected to said crank pin and to the link means connecting said bell cranks, whereby operation of said power operated means will simultaneously elevate both of said valve elements, and said valve elements, rods, bell cranks, link means and link may be quickly and easily disassembled for cleansing.

13. An improved weigh tank having a run-out valve, a support extending across said tank, means mounted on said support for operating said run-out valve, a rotary motor mounted at one side of said tank, speed reduction gearing including a crank operated by said motor, linkage connecting said crank to said valve operating means on said support, whereby rotation of said motor will operate said run-out valve, a highly resilient stop for limiting rotary movement of said crank to a position in which the run-out valve is fully open and stopping further operation of said motor, whereby when current is applied to said motor it will open said run-out valve and hold it open, and when current is discontinued from said motor, said resilient stop will impart a reverse movement to said crank and motor to cause a closing of said valve.

14. An improved weigh tank having a run-out valve, a support extending across said tank, means mounted on said support for operating said run-out valve, a frame hinged to one side of said tank so as to swing away from said tank and expose that side of the tank for cleaning, power operated means mounted on said frame and operating a crank on said frame, valve operating mechanism on said support and detachably connected to said valve, and means detachably connecting said crank and valve operating mechanism.

15. An improved weigh tank having a run-out valve in the bottom wall thereof, power operated means connected to said valve for operating the same into open position, electrical means for controlling the activity of said power operating means, an approximately upright tube depending into said tank adjacent said valve, said tube having a restricted opening in its bottom and an opening in its side above said bottom, an electrode extending into said tube between said openings, and means controlled by the passage of electricity through liquid in said tube and said electrode in the portion between said openings and cooperating with said electrical means for keeping said power operated means active to open said valve after the start of an opening movement thereof by said electrical means, whereby after an opening of said valve, the delay in the escape of liquid from the zone of said tube between said openings will maintain the open position of the valve for an interval of time sufficient to allow all of the remainder of the liquid to run out from said weigh tank, after which the valve will be automatically closed.

16. An improved weigh tank having a run-out valve, a frame mounted on one side of said tank by vertically disposed spaced pivot pins disposed adjacent opposite ends of the frame, each of said pivot pins being movable to release said frame to swing about the other pivot pin and away from said tank side, valve operating means connected to said valve for operating the same, and power operated means mounted on said frame and detachably connected to said valve operating means for operating said run-out valve.

17. An improved weigh tank having a run-out valve, an electric, rotary, overload motor, means connecting said motor to said valve for opening the same, electromagnetic means for starting and stopping the activity of said motor, a circuit for said starting means including a manually operated switch to energize said starting means and start an operation of said motor, a holding circuit closed by said starting means for locking said starting means in energized condition following the opening of said manually operated switch, means including a relatively low voltage, and an electric circuit completed by liquid in said tank and including a relay controlling said holding circuit, whereby said relay will be energized when the liquid level in said tank is above a predetermined level, whereby when liquid is placed in said tank it will cause an energization of said relay and close said holding circuit at said relay, and the run-out of liquid from said tank will break said holding circuit at said relay to automatically cause the deenergization of said motor and a closing of said valve automatically.

18. An improved weigh tank having a run-out valve, an electric, rotary, overload motor, means connecting said motor to said valve for opening the same, electromagnetic means for starting and stopping the activity of said motor, a circuit for said starting means including a manually operated switch to energize said starting means and start an operation of said motor, a holding circuit closed by said starting means for locking said starting means in energized condition following the opening of said manually operated switch, means including a relatively low voltage, and an electric circuit completed by liquid in said tank and including a relay controlling said holding circuit, whereby said relay will be energized when the liquid level in said tank is above a predetermined level, whereby when liquid is placed in said tank it will cause an energization of said relay and close said holding circuit at said relay, and the run-out of liquid from said tank will break said holding circuit at said relay to automatically cause the deenergization of said motor and a closing of said valve automatically, and signal means having a controlling circuit also rendered effective by the energization of the starting means, whereby said signal means will indicate when the valve is open or being opened.

19. An improved weigh tank having at the lowest part of its chamber a run-out valve, a support extending above the tank, lever mechanism carried by said support and having a link depending into the tank and connected to and operating said valve, an operating member extending from said lever mechanism and disposed exteriorly of said tank, said tank having a plurality of lugs on an exterior side wall thereof, a support outside of said tank, and detachably mounted on said lugs, and operating means carried by said support, and having a member detachably connected to said operating member to operate said valve therethrough whereby said support and operating means may be disconnected from said operating member and removed as a unit from said tank.

20. An improved weigh tank having a run-out valve at the bottom thereof, a support extending above the tank, mechanism carried by said support and connected to said valve for opening and closing it, a lever outside of said tank, means connecting said lever to said mechanism to operate the latter, a manually operated shaft disposed entirely on the outside of the tank, supported by the tank, and having a handle disposed in position for operation adjacent one end of the tank, and a cam entirely outside of said tank, operated by said shaft and operable on said lever to cause an opening or closing of said valve depending on the direction of movement of said handle, said cam having a dwell and said lever having a cooperating portion engageable in said dwell and operable for releasably holding said lever in a position in which the valve is open.

21. An improved weigh tank having a run-out valve at the bottom thereof, a support extending above the tank, mechanism carried by said support and connected to said valve for opening and closing it, a shaft having a handle disposed in position for operation adjacent one end of the tank, a pair of spaced bearings for said shaft, each bearing having a slot endwise thereof to enable insertion and removal of the shaft laterally, means detachably connected across the slot of one bearing to releasably prevent removal of the shaft therefrom, the other bearing having a converging end face concentric with the axis of the bearing passage of that bearing, a collar on said shaft and having a recess on one face concentric with said shaft as it passes therethrough, and facing and rotatably telescopic with said end face, whereby when said collar and end face are telescoped, said shaft may rotate but is held against lateral movement out of said other bearing, and when said shaft is moved endwise in one direction said collar is disengaged from said end face, and means operable by said shaft for operating said mechanism.

22. An improved weigh tank having a valve opening arranged in the lowest part of the bottom thereof and having a seat around the periphery of the opening, a valve element seating upon said seat to close said opening and operable upwardly within said tank to leave said seat and allow the contents of the tank to run out, said valve element having a plurality of legs depending therefrom through said opening within the area defined by said seat and by the engagement of said legs with the periphery of said opening guided for vertical movement and kept in alignment with said seat in all positions of movement toward and from said seat, a support extending across said tank and having an aperture therethrough aligned with said seat and an upstanding tubular boss around said aperture, a link detachably and hingedly connected at its lower end to said valve element and passing upwardly through said aperture and boss, an inverted cup carried by the upper end of said link and telescoping loosely over said boss during all vertical movements of said link and valve element as said element is opened and closed on said seat, a lever detachably pivoted on said support and having a forked end straddling and detachably pivoted to said cup, operating means mounted on the side of said tank, and a link detachably connected at its ends to said operating means and to said lever, for operably connecting said means to said lever, whereby said valve element may be operated by said operating means, and all parts detached from one another for cleaning.

23. An improved weigh tank having upright side walls, an open top and a valve opening arranged in the lowest part of the bottom thereof with an upwardly facing seat around the periphery of the opening, a disk-like valve element seating upon said seat to close said opening and operable upwardly within said tank to leave said seat and allow escape of the contents of said tank, said element having a plurality of legs depending from its periphery and which by engagement with the periphery of the opening guides said element in alignment with said opening as it is opened and closed, a support extending across the open, upper end of said tank and having an aperture aligned with said opening, said support also having a tubular boss upstanding therefrom and aligned with said aperture, a link detachably connected at its lower end to said valve element passing upwardly through said aperture and boss and terminating at its outer end in a cap member in the form of an inverted cup, to the inner face of the bottom of which said link is secured, said cup at its open end telescoping downwardly over said boss in all vertical movements of the link in opening and closing said valve element, a lever mounted on said support and detachably engaged at one end with said cup, said tank having a plurality of spaced lugs extending horizontally from one side wall thereof, a frame detachably mounted on said lugs, an operating mechanism mounted on said frame, and a link detachably connected at one end to said operating mechanism and at its other end to said lever, whereby said valve element and all of its operating mechanism may be disconnected from one another for cleaning.

24. An improved weigh tank having upright side walls, an open top and an opening in the bottom having an upwardly facing seat around the periphery of the opening, a disk-like valve element engageable with said seat from within said tank and operable upwardly to uncover said opening, means carried by said valve element and engageable with said opening for guiding said element between open and closed positions and keeping it aligned with said seat, a support extending over the open top of said tank, means carried by said support and having a link depending into said tank and detachably connected to said valve element for lifting the latter, and an operating element extended to one side of said tank, lugs carried by an upright side wall of said tank on the exterior thereof, and operating means detachably connected to said lugs for support on the side of said tank, and detachably connected to said operating element so as to operate said valve element.

25. An improved weigh tank having a run out valve at the bottom thereof, a support extending above the tank, means carried by said support above said tank and connected to said valve within said tank for opening and closing said valve, said tank having a plurality of lugs on an exterior face of a side wall thereof, a plate carried by said lugs and disposed along said side wall, a lever hinged to said plate, link mechanism connecting said lever to said mechanism on said support for operating the latter and through it said valve, a shaft extending and rotatably supported by said plate and having a handle at one end disposed in a position for operation adjacent one end of said tank a cam on said shaft, a follower on said lever riding on said cam and operable by said cam when said shaft is rocked in one direction to cause an opening of said valve, and released by said cam to permit a closing of said valve when said shaft is rocked in the opposite direction, said cam having a dwell engaged by said follower at the end of said movement in said one direction for holding said lever in the position in which said valve is open.

26. An improved weigh tank having a run out valve at the bottom thereof, a support extending above the tank, means carried by said support above said tank and connected to said valve within said tank for opening and closing said valve, said tank having a plurality of lugs on an exterior face of a side wall thereof, a plate carried by said lugs, and disposed along said side wall, a lever hinged to said plate, link mechanism connecting said lever to said mechanism on said support for operating the latter and through it said valve, a shaft extending along and rotatably supported by said plate and having a handle at one end disposed in a position for operation adjacent one end of said tank, and cam means operated by said shaft for moving said lever to operate said valve.

27. An improved weigh tank having a run out valve at the bottom thereof, a support extending above the tank, mechanism carried by the support above the tank and connected to the valve within the tank for opening and closing the valve, said tank having a plurality of lugs on the exterior face on a side wall thereof, a plate detachably connected to said lugs for support thereby, a shaft extending along and parallel to the face of said plate and terminating at one end in a crank, a pair of aligned, spaced bearings for said shaft carried by said plate, said bearings having slots opening laterally into the passages thereof to receive the shaft by movement of the shaft crosswise of its axis into the bearing, one of said bearings having grooves extending along said slots in front of the shaft, while the shaft is in said passages, key means in the grooves of said one bearing and confining the shaft in that bearing, the other of said bearings having a convex end, a collar on said shaft having a cavity which fits over said convex end by endwise movement of said shaft and prevents removal of the shaft from that bearing in a direction crosswise of its longitudinal axis, a cam on said shaft having on that face thereof towards said another bearing, a flange forming a cam surface, a lever hinged to said plate and connected to said valve operating mechanism on said support, said lever abutting endwise against said face of said cam in a manner to prevent endwise movement of said shaft in a direction to disengage said collar from said convex end of said other bearing, and having a follower portion riding said flange, whereby a rotation of said shaft will cam said lever in a direction to cause an opening of said valve.

E. ROY ALLING.